United States Patent
Yin et al.

(10) Patent No.: US 8,527,204 B2
(45) Date of Patent: Sep. 3, 2013

(54) VOLUME OF INVESTIGATION BASED DENSITY IMAGE PROCESSING

(75) Inventors: Hezhu Yin, Humble, TX (US); Pingjun Guo, Bellaire, TX (US); Alberto X. Mendoza, Houston, TX (US)

(73) Assignee: ExxonMobile Upstream Research Company, Houston, TX (US)

(*) Notice: Subject to any disclaimer, the term of this patent is extended or adjusted under 35 U.S.C. 154(b) by 448 days.

(21) Appl. No.: 12/678,040

(22) PCT Filed: Oct. 10, 2008

(86) PCT No.: PCT/US2008/079571
§ 371 (c)(1),
(2), (4) Date: Mar. 12, 2010

(87) PCT Pub. No.: WO2009/073277
PCT Pub. Date: Jun. 11, 2009

(65) Prior Publication Data
US 2010/0228484 A1    Sep. 9, 2010

Related U.S. Application Data

(60) Provisional application No. 61/005,591, filed on Dec. 6, 2007.

(51) Int. Cl.
*G01V 9/00* (2006.01)
(52) U.S. Cl.
USPC .................................. 702/11; 702/6; 702/9
(58) Field of Classification Search
USPC ............................................. 702/6, 10–11
See application file for complete search history.

(56) References Cited

U.S. PATENT DOCUMENTS

| | | | |
|---|---|---|---|
| 2,712,081 A | | 6/1955 | Fearon et al. |
| 2,957,990 A | * | 10/1960 | Newton et al. ................ 250/268 |
| 6,237,404 B1 | * | 5/2001 | Crary et al. ................ 73/152.03 |
| 6,307,199 B1 | | 10/2001 | Edwards et al. |
| 6,795,774 B2 | | 9/2004 | Xiao |
| 7,114,565 B2 | | 10/2006 | Estes et al. |
| 2006/0131016 A1 | | 6/2006 | Snoga |
| 2007/0265784 A1 | | 11/2007 | Bal et al. |
| 2007/0267192 A1 | * | 11/2007 | Wang et al. ................ 166/254.2 |

OTHER PUBLICATIONS

Uzoh, E.A., "Quantitative Studies of Relative Dip Angle and Bed-Thickness Effects on LWD Density Images Acquired in High-Angle and Horizontal Wells", 2007, Thesis: The University of Texas in Austin, pp. 1-53.*

(Continued)

*Primary Examiner* — Mischita Henson
(74) *Attorney, Agent, or Firm* — ExxonMobile Upstream Research Company Law Dept.

(57) ABSTRACT

Systems and methods which provide accurate formation information regardless of formation and borehole geometry, including those associated with high angle and horizontal wells, are shown. In providing processing of logging or image data, such as may be provided by a density tool or other tool, according to embodiments, formation attributes or features (e.g., density and dip angle) are estimated using raw data provided by a the tool. The foregoing estimations may thereafter be iteratively refined using effective volume of interest (EVOI) information. According to embodiments, depth boundaries of formation information provided by the tool are shifted as a function of azimuth for correct spatial positioning of formation features using EVOI information. Processing of formation attribute or feature data provided by embodiments may be used with respect to various tool configurations, including configurations with and without borehole standoff.

22 Claims, 7 Drawing Sheets

(56) References Cited

OTHER PUBLICATIONS

Badruzzaman, A. et al. (2007), "Density Measurement Sensitivity to Varying Borehole Angle and Tool Azimuth Medium to Thin Beds", SPWLA 48th Annual Logging Symposium, Jun. 3-6, 2007, pp.

Liu, Z., et al. (2007), "Joint Inversion of Density and Resistivity Logs for the Improved Petrophysical Assessment of Thinly-Bedded Clastic Rock Formations", SPWLA 48TH Annual Logging Symposium, Jun. 3-6, 2007, pp. 1-15.

Uzoh, E.A. (2007), "Quantitative Studies of Relative Dip Angle and Bed-Thickness Effects on LWD Density Images Acquired in High-Angle and Horizontal Wells", Thesis—The University of Texas in Austin, pp. 1-53.

Xu, L. et al. (2007), "Responses of Nuclear Tools in Layered Media", SPWLA 48th Annual Logging Symposium, Jun. 3-6, 2007, 13 pgs.

*European Search Report*, dated Apr. 21, 2009.

*International Search Report & Written Opinion*, dated Dec. 12, 2008.

\* cited by examiner

VOLUME OF INVESTIGATION BASED DENSITY IMAGE PROCESSING

CROSS-REFERENCE TO RELATED APPLICATION

This application is the National Stage entry under 35 U.S.C. 371 of PCT/US2008/079571 that published as WO 2009/073277 and was filed on 10 Oct. 2008, which claims the benefit of U.S. Provisional Application No. 61/005,591, filed on 6 Dec. 2007, each of which is incorporated by reference, in its entirety, for all purposes.

TECHNICAL FIELD

The present invention relates generally to processing image or logging information and, more particularly, to volume of investigation based image or logging processing.

BACKGROUND OF THE INVENTION

In geological exploration it is desirable to obtain information regarding the various formations and structures which exist beneath the Earth's surface. Accordingly, various sensors, probes, and test equipment (collectively referred to as "tools") have been employed to determine geological strata, density, porosity, composition, etc. when searching for hydrocarbon reserves. For example, dual detector compensated density tools, wherein a gamma source and two corresponding detectors or sensors are used to collect geological data, have been widely used for hydrocarbon exploration since the 1980's.

Dual detector compensated density tools are often employed in logging while drilling (LWD) operations, so as to provide information regarding the geological structures without requiring removal of the drill stem. In operation, the dual detector compensated density tool is used to make measurements in a plurality of azimuthhally binned sectors (e.g., 16 binned sectors) to produce a density log providing a 360° view around the borehole.

In a LWD dual detector compensated density tool configuration, the source and detectors are located on the side wall of the drill collar to avoid attenuation of the gamma rays by the drill pipe. Thus, the source and detectors are disposed off-center, or on an eccentric, with respect to the center of the borehole.

Although density images acquired using the foregoing LWD dual detector compensated density tools can reveal sedimentary structure of formation penetrated by the borehole, the effect of formation (e.g., sediment bedding) and borehole geometry on density measurement has heretofore not been addressed. For example, many post-processing procedures used with respect to dual detector compensated density tools assume a one-dimensional variation of the formation density. The widely used $\Delta\rho$ density compensation technique assumes an infinitely thick formation, and hence assumes a one-dimensional radial variation. Similarly, the commonly used $\alpha$-processing technique, used for vertical resolution enhancement, assumes one-dimensional vertical variation.

Such one-dimensional assumptions have typically provided acceptable results with respect to vertical borehole geometries penetrating horizontal formation geometries (e.g., horizontal sediment beds). However, it has been discovered that such conventional density compensation post-processing procedures result in significant error, and the benefits resulting from $\alpha$-processing decrease, as the relative dip between the borehole and formation increase. For example, high angle and horizontal (HA/HZ) wells, and similarly wells penetrating sediment beds having an appreciable bed dip, experience errors in bulk density (RHOB) estimation and bed boundary detection. The eccentricity and azimuthal rotation while drilling of the LWD dual detector compensated density tools make the tool response difficult to interpret with regard to the borehole and formation, particularly in HA/HZ wells.

BRIEF SUMMARY OF THE INVENTION

In one general aspect, a method includes estimating a formation boundary depth from well log data, said well log data providing formation attribute data for a plurality of azimuth angles, wherein said formation boundary depth is estimated for each of said azimuth angles. Effective volume of investigation information is analyzed to determine an effective depth of investigation ($\Delta D$) and an effective shift in height ($\Delta h$) of a formation boundary surface associated with the formation boundary depth. The formation boundary depth estimate is refined using at least one of the effective depth of investigation ($\Delta D$) and the effective shift in height ($\Delta h$). The present inventive method for well log data processing is suitable for automation, for example as a computer program product having a computer readable medium storing computer executable code for correcting formation boundary dip angle or formation boundary depth as determined from well log data.

Implementations of this aspect may include one or more of the following features. For example, one or more of the formation boundary depth, the effective depth of investigation, the effective shift in height may be used to create or modify development plans, and/or to produce hydrocarbons from a subsurface region based on the development plans. The present invention is directed to systems and methods which provide accurate formation information regardless of formation and borehole geometry. Embodiments of the invention provide accurate correction with respect to high angle and horizontal (HA/HZ) wells, and other wells in which the angle between the normal of the formation plane (e.g., sediment bed) and borehole axis is other than zero (i.e., relative dip between borehole and formation), as well as conventional vertical wells present a perpendicular strike angle at the formation boundaries. Additionally, embodiments of the invention provide resolution enhancement with respect to wells having a high relative dip between borehole and formation as well as wells presenting a more perpendicular strike angle at the formation boundaries. The foregoing correction may be provided with respect to various well attributes or features, such as geological strata, density, porosity, composition, etc., as presented in well logging or image data. Post-processing of data provided by a density tool, such as a logging while drilling (LWD) dual detector compensated density tool, is provided according to embodiments of the invention to accurately determine formation density and geometry. In providing post-processing of density tool data according to embodiments of the invention, formation density and dip angle are estimated using raw data provided by a density tool. The foregoing density and dip angle estimations are, preferably, thereafter iteratively refined using effective volume of interest (EVOI) information. For example, depth boundaries (e.g., measured depth (MD)) of formation information provided by a density tool are shifted as a function of azimuth for correct spatial positioning of formation features using the foregoing EVOI information. Such post-processing techniques, as implemented according to embodiments of the invention, provide accurate density and resolution enhancement (e.g., bed boundary dip angle) with respect to wells having a high relative dip between borehole and the normal of the formation plane as well as wells presenting a more perpendicular strike angle at the formation boundaries.

Post-processing of density tool data provided by embodiments of the invention may be used with respect to various tool configurations. For example, the foregoing post-processing techniques may be utilized to provide accurate density and resolution enhancement with respect to density tools wherein the tool's sensors are disposed against the borehole (i.e., no standoff is present). Likewise, the foregoing post-processing techniques, adapted to implement a standoff parameter (e.g., a density correction constant, $\Delta\rho_c$), may be utilized to provide accurate density and resolution enhancement with respect to density tools wherein the tool's sensors are disposed away from the borehole (i.e., standoff is present).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE INVENTION

A brief description of the operation of a typical logging while drilling (LWD) dual detector compensated density tool, and the data collected thereby (i.e., well log data, specifically density log data), is provided in order to aid in understanding the concepts of the present invention. It should be appreciated that the present invention may be utilized with respect to post-processing of data provided by density tools, as well as other tools, other than the exemplary LWD dual detector compensated density tool. For example, embodiments of the present invention may be utilized with respect to wireline tool configurations. Likewise, embodiments of the invention may be utilized with respect to tools providing logging or image data (i.e., well log data) comprising geological strata, density, porosity, composition, etc., and combinations thereof.

Figure 1:
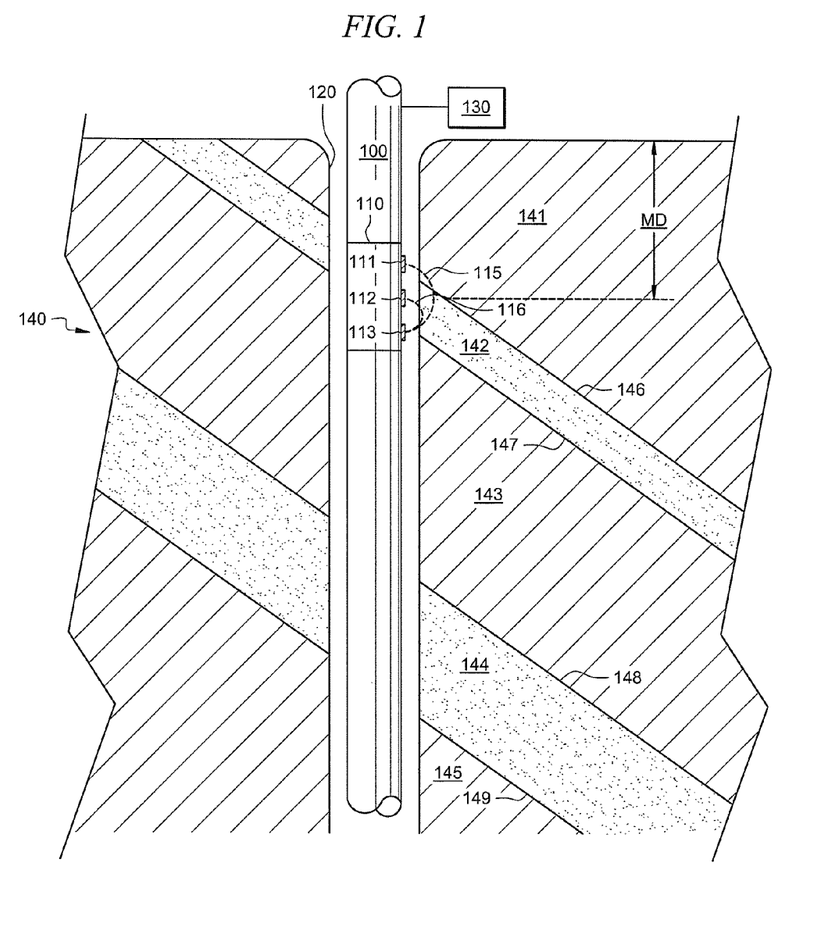
FIG. 1 shows a portion of a drilling system as may be utilized to collect density data processed according to embodiments of the invention.

Directing attention to FIG. 1, a portion of a drilling system as may be used for geological exploration of various formations and structures which exist beneath the Earth's surface and/or to reach mineral deposits, such as hydrocarbon reserves, is shown. The drilling system of FIG. 1 includes drill stem 100 disposed in borehole 120. Although not shown in the illustration, drill stem 100 typically comprises a drill bit at a distal end thereof and a drill rig, including a derrick, drawworks, and topdrive, disposed over the drill string in order to provide rotational (drilling) and linear (insertion and extraction) movement to the drill string. It should be appreciated that, although shown having a gap (standoff) between the walls of borehole 120 and the sides of drill string 100 in order to simplify the illustration, there may be no, or substantially no, standoff between the walls of borehole 120 and the sides of drill string 100 in some configurations. Additionally, the gap between the walls of borehole 120 and the sides of drill string 100 may be filled with media, such as "drilling mud" (drilling fluid and proppants).

Drill string 100 of FIG. 1 includes density tool 110 used for collecting density information with respect to formation 140, shown as including sediment beds 141-145 separated by respective ones of bed boundaries 146-149. Sediment beds 141-145 may comprise various formation media, such as sediment beds 141, 143, and 145 comprising shale and sediment beds 142 and 144 comprising sand. Density tool 110 of the illustrated embodiment comprises a dual detector density tool, and thus includes long space (LS) detector 111, short space (SS) detector 112, and source 113. According to embodiments, source 113 comprises a gamma ray (GR) source. In such an embodiment, LS detector 111 and SS detector 112 comprise GR detectors used to detect gamma rays emitted from source 113 as scattered by formation 140. The propagation of rays from the source to the detectors is represented in FIG. 1 by dotted lines 115 and 116 between source 113 and each of LS detector 111 and SS detector 112, respectively.

In operation, drill string 100, and thus density tool 110, is rotated such that a plurality of azimuth "views" are presented to the source and sensors of density tool 110. For example, drill string 100 may be rotated in 16 steps of 22.5° to provide views into formation 140 centered at 11.25°, 33.75°, 56.25°, 78.75°, 101.25°, 123.75°, 146.25°, 168.75°, 191.25°, 213.75°, 236.25°, 258.75°, 281.25°, 303.75°, 326.25°, and 348.75°. Of course, fewer or more azimuth steps may be used, such as depending upon the aperture provided by density tool 110, according to embodiments of the invention. Logging equipment 130, such as may comprise a processor based control system having memory storing an instruction set defining operation as described herein for gathering, storing, and processing information from density tool 110, may thus be used in combination with density tool 110 to make measurements in a plurality of azimuthally binned sectors (e.g., 16 binned sectors) to produce a density log providing a 360° view around borehole 120 at a particular measurement depth (MD). It should be appreciated that a full 360° view need not be provided, if desired. For example, a 180° view may be provided, wherein the remaining 180° view may or may not be estimated as a mirror image of the view provided.

Formation density values may be estimated as a function of the count rate, e.g., gamma ray count rate (N), provided by each of LS detector 111 and SS detector. In the foregoing example, the SS and LS detector count rates are acquired and binned into 16 equally-spaced angular sectors while the tool string rotates around the borehole. These binned count rates may then be processed to compute the compensated density values in individual sectors.

In traditional density estimation, it is assumed that the formation is infinitely thick (i.e., homogeneous) both horizontally and vertically. Accordingly, techniques such as the widely used Δρ density compensation technique provides compensation for borehole offset at each bin or azimuth view by calculating compensated density ($\rho_{comp}$) as a function of a LS detector density ($\rho_{LS}$) estimate, which is based upon the LS count rate ($N_{LS}$), and a function of the difference between the LS detector density estimate and a SS detector density ($\rho_{SS}$) estimate, which is based upon the SS count rate ($N_{SS}$), this difference being referred to as Δρ. These relationships are set forth in the following equations:

$$\Delta\rho = f(\rho_{LS} - \rho_{SS}) \quad (1)$$

$$\rho_{comp} = \rho_{LS} + \Delta\rho \quad (2)$$

The compensated densities calculated for each bin are typically color coded and plotted on a 16-track layout to produce a density image (e.g., an "unrolled" borehole density view of the formation).

As can be appreciated by the ray propagation traces represented in FIG. 1, the foregoing Δρ density compensation technique may be relied upon to provide a relatively accurate density calculation which is compensated for borehole offset where the formation is substantially homogeneous (e.g., infinitely thick horizontally and vertically) at the measured depth. Density logs provided by such density tools, however, have recently found more applications beyond real time geosteering and completion interval selections, wherein density estimation errors associated with the non-homogeneity of the formation become significant.

In many complex reservoirs density images have begun to be used to estimate bed inclination or dip (e.g., angle from horizontal of bed boundary 144 or bed boundary 145) and thickness (e.g., thickness of sediment bed 142 as determined by bed boundaries 144 and 145). However in high angle and horizontal (HA/HZ) wells the current industry practice of constructing density images using SS and LS detector compensated density data and calculating dip information can be problematic. In particular, it has been discovered in arriving at the present invention that investigation volume (the volume of the formation affecting the density measurement) by the density tool, the varying angles between borehole axis and bedding planes, and the bed thickness affect the data collected at the SS and LS detectors differently.

Figure 2:
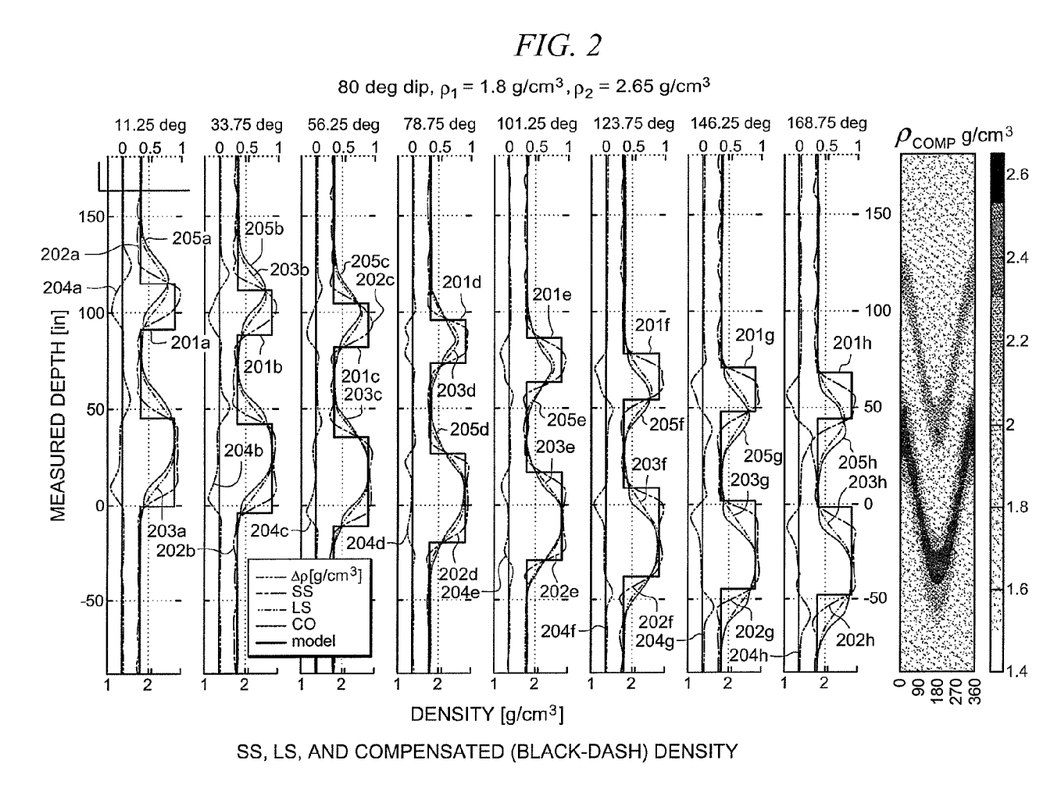
FIG. 2 shows density logs and density image as may result from the density data collected by the drilling system of FIG. 1.

Directing attention to FIG. 2, Monte Carlo for N particles (MCNP) simulation results of compensated density calculation using equations (1) and (2) above with respect to density log information as may be provided by a density tool such as density tool 110 for a formation presenting sediment beds of alternating media, such as shown in FIG. 1, disposed in planes having an 80° dip angle well is shown. The simulation of FIG. 2 is provided without borehole standoff, such that the area for invading density ($\rho_2$) is infinitely small (e.g., there is no mud cake) and thus the background or formation density ($\rho_1$) is measured (i.e, Δρ should be zero everywhere) is shown. The 8 graphs shown from left to right in FIG. 2 represent the density data at azimuth views starting from 11.25° to 168.75°, in 22.5° increments, at various measured depths. Lines 201a-201h represent the model density at a respective azimuth view, wherein the rectangular protrusions correspond to the change in density of alternate ones of the simulated sediment beds. Lines 202a-202h represent the SS density ($\rho_{SS}$) at the respective azimuth view, as determined from the simulated SS count rate ($N_{SS}$). Lines 203a-203h represent the LS density ($\rho_{LS}$) at the respective azimuth view, as determined from the simulated LS count rate ($N_{LS}$). Lines 204a-204h represent the calculated density compensation (Δρ) at the respective azimuth view, as determined by equation (1). Lines 205a-205h represent the calculated compensated density ($\rho_{comp}$) at the respective azimuth view, as determined by equation (2). The image shown at the right of FIG. 2 represents the density image (e.g., an unrolled borehole density view of the formation) generated using the foregoing density data.

The calculated compensated density ($\rho_{comp}$) in FIG. 2 has significant errors across bed boundaries. Specifically, in the example shown there is significant up-shifted depth responses for $\rho_{LS}$ and ($\rho_{comp}$) from azimuth=11.25° to 101.25°, and down-shifted depth responses for $\rho_{LS}$ and ($\rho_{comp}$) from azimuth=110.25°, 168° azimuth. Thus density images created from such $\rho_{LS}$ and ($\rho_{comp}$) logs will be incorrect. In particular, formation density at particular measured depths will be incorrect and formation geometry will be incorrectly represented.

It has been discovered that erroneous Δρ generation, wherein Δρ calculations result in the wrong signs (i.e., Δρ is negative where it should be positive and vice-versa) across bed boundaries, is due at least in part to the different vertical resolution and depth of investigation between LS detector and the SS detector. This will introduce significant density error when such a compensation process is applied to dual detector density data from HA/HZ wells, as illustrated in the foregoing example.

Embodiments of the present invention provide accurate density information regardless of formation and borehole geometry. Accordingly, accurate density information, and thus accurate density images, may be obtained with respect to high angle and horizontal (HA/HZ) wells, and other wells in which the angle between the normal of the formation plane (e.g., sediment bed) and borehole axis is other than zero (i.e., relative dip between borehole and formation), as well as conventional vertical wells presenting a perpendicular strike angle at the formation boundaries. Additionally, embodiments of the invention provide resolution enhancement with respect to wells having a high relative dip between borehole and formation as well as wells presenting a more perpendicular angle at the formation boundaries.

The measurement point for a source/detector pair (e.g., source 113 and SS detector 112 and source 113 and LS detector 111) is commonly assumed to be the midpoint between the source and detector. This assumption may provide acceptable results in a vertical well with horizontal bed geometry. However, in HA/HZ wells, the bed boundaries indicated by inflection points of the SS and LS logs appear at an earlier position in depth as the tool azimuth is near zero, and at later position in depth as the tool azimuth is nears 180° when the tool traverses a sediment bed boundary. This is because the density tool does not see the bed boundary at the borehole wall but rather at a depth that is defined by the effective volume of investigation (EVOI). Post-processing of data provided by a density tool, such as density tool 110 of FIG. 1, is provided according to embodiments of the invention using EVOI analysis to accurately determine formation density and geometry. For example, in providing post-processing of density tool data according to embodiments of the invention, depth boundaries (e.g., measured depth) of formation information provided by a density tool are shifted as a function of azimuth for correcting the spatial positioning of formation features using EVOI information. The resulting density and dip angle estimations are preferably iteratively refined.

The volume of investigation comprises the area viewed or impinging upon the counts provided by the SS and LS detectors, and thus corresponds to the area under corresponding ones of dotted lines 115 and 116. Accordingly, the EVOI by a dual-detector density tool such as density tool 110 depends on the detector spacing and formation properties, and thus may be estimated as a function of the foregoing. Further, EVOI may be decomposed in terms of the conventional concepts as the radial depth of investigation (RDOI), the vertical resolution (VR), and azimuthal aperture (AA or $\Delta\phi$) related to the binning measurements of the tool (e.g., azimuth aperture of density tool 110). In a vertical well, RDOI affects the bulk density measurement and VR (equivalently the axial geometric factor) affects the detection of the bed boundaries. However, in a HA/HZ well, both RDOI (equivalently the radial geometric factor) and VR (equivalently the axial geometric factor) affect the density measurements and the detection of the sediment bed boundaries. The higher the sediment bed dip angle is, the more effect from RDOI on both the axial resolution and density estimation.

Figure 3A:
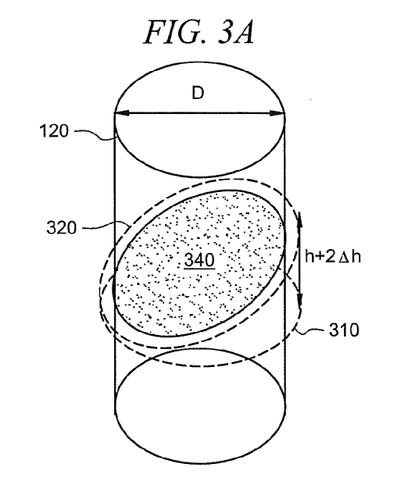
FIGS. 3A-3C show a schematic diagram of relative dip estimation from a density image.
Figure 3B:
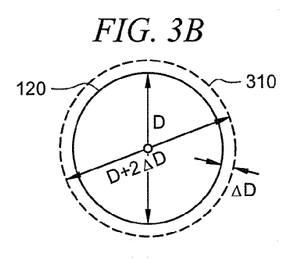
Figure 3C:
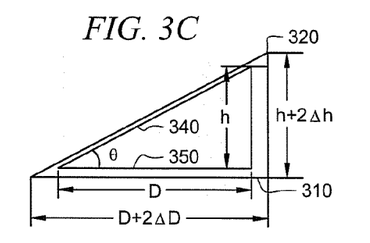

FIGS. 3A-3C help illustrate the concept of EVOI analysis as utilized according to embodiments of the invention. Borehole 120 of FIG. 1 is represented in FIGS. 3A-3C, wherein plane 340 represents the plane of a sediment bed boundary, such as any of bed boundaries 146-149 shown in FIG. 1, and plane 350 represents a plane orthogonal to density tool 110, such as may correspond to a density tool view plane. Line 310 represents the RDOI of density tool 110. Although only a single RDOI line is represented in FIGS. 3A-3C for simplification of the figures, it should be appreciated that a different RDOI is associated with each of LS detector 111 and SS detector 112. Line 320 represents the RDOI of density tool 110 in the plane of the sediment bed boundary. Again, although only a single RDOI line in the plane of the sediment bed boundary is represented in FIGS. 3A and 3C for simplification of the figure, it should be appreciated that a different RDOI in the plane of the bed boundary is associated with each of LS detector 111 and SS detector 112.

In FIGS. 3A-3C, h is the height of the sediment bed boundary dip surface above the density tool view plane at an associated azimuth view. Accordingly, h corresponds to the height of the sinusoidal line in the density image representing the particular sediment bed boundary. D is the borehole diameter, which is known, and $\Delta D$ is the effective depth of investigation, which may be estimated from the tool configuration. Accordingly, as can be seen in FIGS. 3A-3C, $\Delta h$ is the effective shift in height of the sediment bed boundary dip surface associated with the effective depth of investigation.

Figure 4:
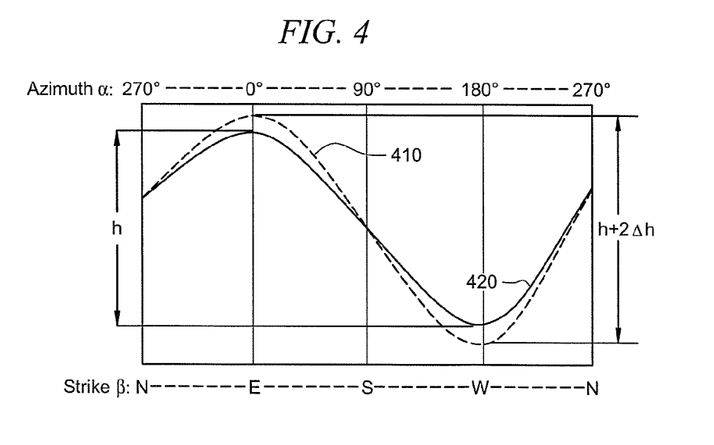
FIG. 4 shows an unrolled borehole density graph wherein the shift in height of the sediment bed boundary is represented graphically.

The foregoing shift in the height of the sediment bed boundary is represented graphically in the unrolled borehole density graph FIG. 4, wherein line 410 represents a density image (e.g., $\rho_{SS}$, $\rho_{LS}$, or $\rho_{comp}$) as actually "viewed" by the density tool (i.e., at the RDOI) whereas line 420 represents the density image (e.g., $\rho_{SS}$, $\rho_{LS}$, or $\rho_{comp}$) shifted to the borehole wall (i.e., without RDOI shift as is typical with the assumption that the measurement point for a source/detector pair is the midpoint between the source and detector). The height shift in HA/HZ well is more obvious with respect to $\rho_{LS}$ and $\rho_{comp}$ because $\Delta D$ is larger for $\rho_{LS}$ and $\rho_{comp}$ than for $\rho_{SS}$ (as can be appreciated by the EVOIs represented by lines 115 and 116 in FIG. 1).

Such a shift in the height of the sediment bed boundary dip surface has been found to introduce significant error in the density image as described above with respect to FIG. 2. Specifically, when the density log (lines 202a-202h, 203a-203h, 204a-204h, and 205a-205h) are compared with the density model (lines 201a-201h, which represent the formation density model and thus are shifted properly as a function of azimuth under the given sediment bed dip), significant errors in depth mismatch due to dip and EVOI can be appreciated. Hence, $\Delta D$ provides a parameter for determining the position in depth where each detector would detect a sediment bed boundary, and thus is used according to embodiments of the invention for sediment bed boundary dip angle estimation.

From the relationships shown in FIGS. 3A-3C, EVOI as utilized according to embodiments of the invention may be decomposed in terms of the RDOI, the VR, and AA ($\Delta\phi$) as shown below:

$$EVOI = \Delta D^2 \cdot \Delta h \cdot \Delta\phi \qquad (3)$$

wherein $\Delta D$ is a function of the RDOI, $\Delta\phi$ is defined by the density tool aperture, and $\Delta h$ is a function of the RDOI and VR. Such EVOI unifies the density tool's resolution and defines it in space as function of radial depth of investigation, axial resolution, and azimuthal aperture. The foregoing avoids confusion between the effect of the vertical resolution of a tool in a vertical well and horizontal bed, and the effect of the depth of investigation in HA/HZ well.

A value for EVOI may be estimated as a function of detector spacing and formation properties. Geometric factors (GF) analysis (i.e., axial and/or radial geometric factors) may be utilized in determining the effects of formation properties on EVOI. The geometric factors for a dual-detector density tool, such as density tool 110, along any particular radius originating at the tool face and radiating therefrom may be determined according to the following:

$$G(r) = (\rho(r) - \rho_1)/(\rho_2 - \rho_1) \qquad (4)$$

Figure 5:
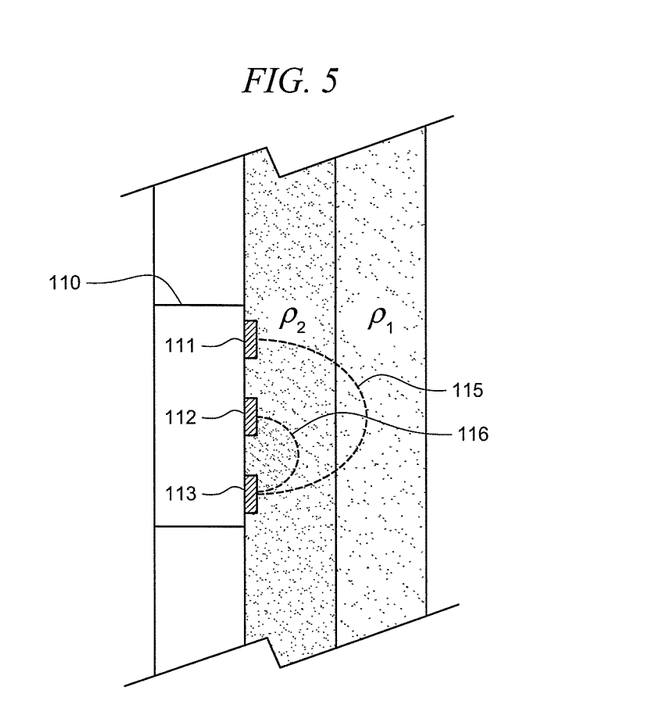
FIG. 5 shows the background density and invading density use in geometric factors analysis.

In the foregoing equation, $\rho_1$ comprises background density (e.g., formation density) and $\rho_2$ comprises invading density (e.g., standoff or mud cake density) as shown in FIG. 5, which substantially correspond to $\rho_{SS}$ and $\rho_{LS}$. The foregoing geometric factors are utilized in a measured density based analysis for estimating EVOI. Specifically, it has been found that for background and invading densities in the range of 1.66 to 2.65 g/cc (e.g., mud cake and Earth formation densities typically associated with hydrocarbon exploration) the radial depths at G(r)=0.5 are nearly constants, and thus substantially independent of the particular densities experienced. That is, it was determined that the sensitivity of the radial geometric factor G(r) to the formation density contrast is small, and thus the RDOI shows negligible dependence on density variation. Consequently, it was found that the radial depth at G(r)=0.5 is equivalent to the industry standard depth of investigation (e.g., 50% of the detector count contribution is from inside of that depth and 50% of the detector count contribution is from outside of that depth). Accordingly, EVOI may be estimated according to embodiments of the invention from the foregoing geometric factors and density information (e.g., using initial density calculations ($\rho_{SS}$, $\rho_{LS}$, and/or $\rho_{comp}$) from the density logs).

A relative sediment bed boundary dip angle estimation ($\theta$), as shown in FIG. 3C, may be calculated as follows:

$$\theta = \tan^{-1}\left(\frac{h + 2\Delta h}{D + 2\Delta D}\right) \quad (5)$$

As discussed above, h is the amplitude of the sinusoidal line (e.g., the height of dip surface) from the density image, D is the borehole diameter, $\Delta D$ is the effective depth of investigation which is a function of RDOI, and $\Delta h$ is effective shift height (e.g. depth in MD) of the dip surface boundary. Assuming a small error in $\Delta D$ and $\Delta h$, the error in dip estimation ($\Delta\theta$) can be expressed as:

$$\Delta\theta = \frac{D}{D^2 + h^2}(\Delta h + h \cdot \ln D \cdot \Delta D) \quad (6)$$

From the above, the distance between the actual sediment bed boundary location and the sediment bed boundary as provided by the density log, or $\Delta h$, is the effective shift height (e.g. depth in MD) of the dip surface boundary, as shown in FIGS. 3A-3C. The intersection of the idealized effective volume of investigation, as set forth in equation (3), at a given $\Delta D$ with the bed boundary provides a geometrical relation to determine $\Delta h$ for each detector (e.g., $\Delta h_{SS}$ and $\Delta h_{LS}$). When the wall of borehole is unrolled to a flat plane as shown in FIG. 4, the value of $\Delta h$ for each detector can be estimated as a function of the azimuth rotation at a given dip angle by:

$$\Delta h = \Delta D \cos(\alpha + \beta) \tan(\theta). \quad (7)$$

In the foregoing equation, $\alpha$ is the azimuth of the density tool facing (i.e., the direction of the density tool view), $\beta$ is the strike (i.e., the azimuth of the intersection of the dipping bed with a horizontal plane) of the dipping bed (or deviated borehole), and $\theta$ is the relative dip between borehole and formation bed. From the foregoing, it can be seen that embodiments of the present invention may be utilized to plot sediment bed boundaries as a function of the azimuth.

Figure 6:
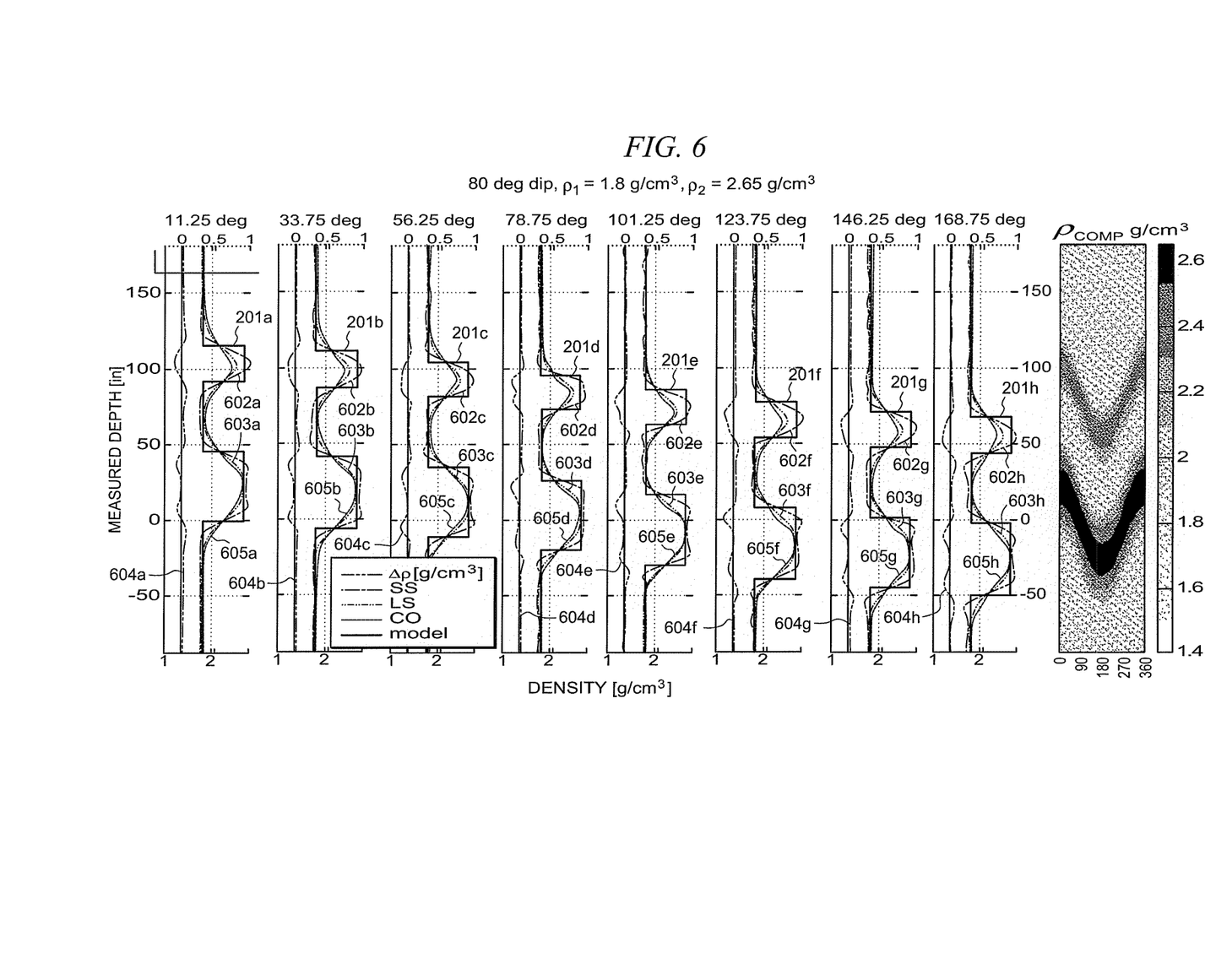
FIG. 6 shows density log information and density image corrected for the effective depth of investigation and the effective shift in height of the sediment bed boundary dip surface associated with the effective depth of investigation according to an embodiment of the invention.

FIG. 6 illustrates where $\rho_{LS}$, $\rho_{SS}$, and $\rho_{comp}$ of the example shown in FIG. 2 have been shifted after having used the foregoing equations to solve for $\Delta h$. Specifically, FIG. 6 illustrates shifting of $\rho_{LS}$ by $\Delta h_{LS}$ and $\rho_{SS}$ by $\Delta h_{SS}$ such that $\rho_{comp}$ is shifted by an appropriate $\Delta h$. As in FIG. 2, the 8 graphs shown from left to right in FIG. 6 represent the density data at azimuth views 11.25°-168.75°, in 22.5° increments, at various measured depths. Lines 201a-201h represent the model density at a respective azimuth view, wherein the rectangular protrusions correspond to the change in density of alternate ones of the simulated sediment beds. Lines 602a-602h represent the SS density ($\rho_{SS}$) shifted by $\Delta h_{SS}$. Lines 603a-603h represent the LS density ($\rho_{LS}$) shifted by $\Delta h_{LS}$.

Comparing lines 604a-604h of FIG. 6 (after EVOI analysis correction) with lines 204a-204h of FIG. 2 (before correction), the $\Delta\rho$ magnitude is significantly reduced and is consistent through all the azimuthal sectors. As can be appreciated from lines 602a-602h and 603a-603h more closely corresponding to the rectangular protrusions of the model density of lines 201a and 201h than do lines 202a-202h and 203a-203h of FIG. 2. Likewise, the compensated density $\rho_{comp}$ of lines 605a-605h calculated from the LS density ($\rho_{LS}$) and SS density ($\rho_{comp}$) shifted by a corresponding shift height ($\Delta h_{LS}$ and $\Delta h_{SS}$) more closely correspond to the rectangular protrusions of the model density of lines 201a-201h than do lines 205a-205h of FIG. 2. Accordingly, the inflection point of the LS and SS logs, as well as the compensated density calculated therefrom, is aligned with the actual sediment bed boundaries, thereby resulting in more accurate formation information regardless of formation and borehole geometry. Moreover, the resulting compensated density sinusoidal image exhibits smaller height (h) after the application of the $\Delta D$ correction which will results in more accurate dip estimation.

Figure 7:
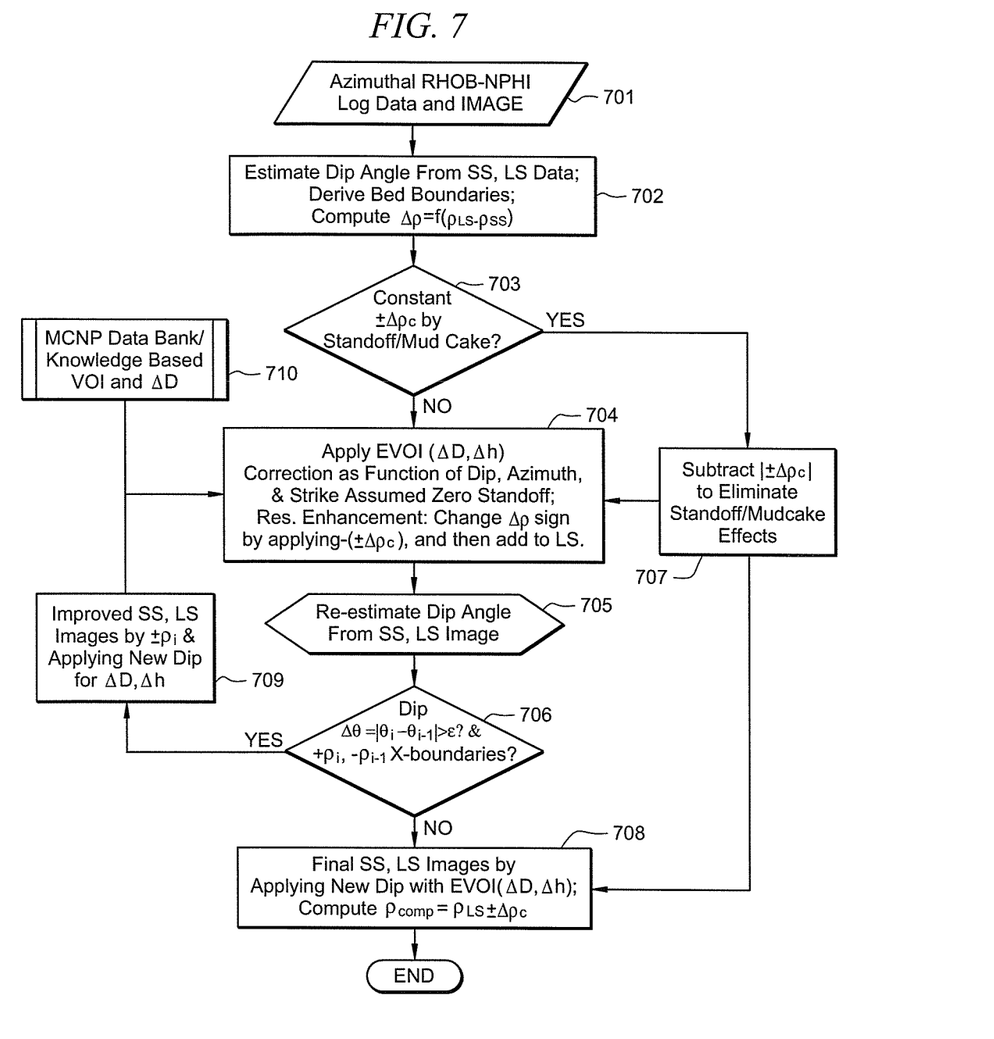
FIG. 7 shows a flow chart of operation to provide the corrected density log information and density image of FIG. 6 according to an embodiment of the present invention.

Having described concepts of the present invention above, reference is now made to FIG. 7 wherein a flow diagram providing additional detail of operation according to a preferred embodiment of the present invention is shown. Although in the above examples assumed no standoff or mud cake in order to simply the concepts presented, the embodiment of FIG. 7 provides compensation both with and without standoff or mud cake.

At block 701 of the embodiment illustrated in FIG. 7, density tool 110 and logging equipment 130 are utilized to collect azimuthal bulk density log data. This log data may be utilized in generating an initial (uncorrected by $\Delta h$) density image, such as through operation of logging equipment 130 or other processor based system. At block 702 a sediment bed dip angle and sediment bed boundaries are estimated using the raw density log data (e.g., LS and SS data), as described above. Additionally, the illustrated embodiment also computes $\Delta\rho$ from the raw density log data, using equation (1), for use in mitigating the effects of standoff or mud cake.

Figure 8:
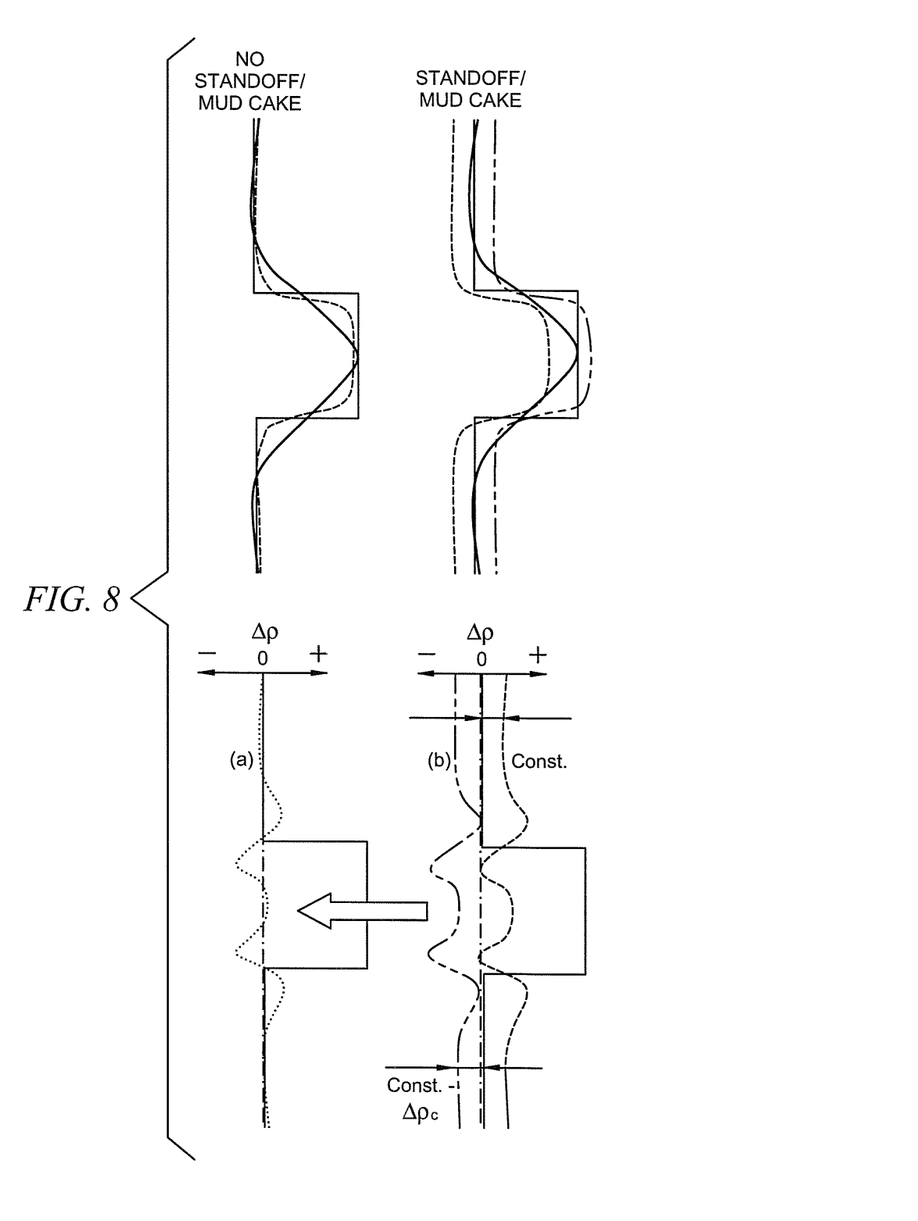
FIG. 8 shows determination of a standoff or mud cake density constant used in and embodiment of the flow chart of FIG. 7.

At block 703 a determination is made as to whether the computed $\Delta\rho$ indicates that a standoff or mud cake is present. For example, where $\Delta\rho$ is a substantially constant positive or negative value throughout an area of the formation which does not traverse a sediment bed boundary (see FIG. 8), that value of $\Delta\rho$ is likely associated with a standoff or mud cake. If it is determined that there is a standoff or mud cake, the constant value of $\Delta\rho$ associated therewith $\Delta\rho_c$ is subtracted from the SS and LS data (e.g., $\rho_{SS}$ and $\rho_{LS}$) at block 707 to eliminate the effects of the standoff or mud cake and processing proceeds to block 704. If it is determined that there is not standoff or mud cake, then processing also proceeds to block 704 in the illustrated embodiment.

At block 704, EVOI analysis of the present invention, utilizing $\Delta D$ and $\Delta h$ as set forth above, provides correction to the SS and LS data as function of relative dip, azimuth, and strike angle. The illustrated embodiment of the invention provides vertical resolution enhancement at block 704 by changing the sign (+/−) of $\Delta\rho$ and adding this value to $\rho_{LS}$. As can be seen by lines 201a and 203a and lines 201h and 203h, adding $\Delta\rho$ having a changed sign to $\rho_{LS}$ provides measurement depth shift to $\rho_{LS}$.

At block 705, the sediment bed dip angle is re-estimated from the corrected SS and LS data. Although re-estimation of dip angle from the SS and LS data is shown here as a separate step, it should be appreciated that such re-estimation may be provided as the processing set forth in block 704.

At block 706 of the illustrated embodiment, a determination is made as to whether further iterations of EVOI analysis and correction should be applied to the density log data. For example, as the data is corrected, iterative improvement in the results diminishes such that further iterations do not provide substantially improved results. Accordingly, embodiments of the invention, wherein an iterative process is utilized, operate to determine if further EVOI analysis iterations are desired. The illustrated embodiment calculates an error in dip estimation ($\Delta\theta$), as shown in equation (6), and compares this error in dip estimation to the difference in estimated dip angle of a current iteration and that of a previous iteration to determine if further iterations should be conducted. If the error in dip estimation is less than or equal to the difference in estimated dip angle of a current iteration and that of a previous iteration, or a predetermined threshold, and the bulk density for those iterations crosses a sediment bed boundary, processing proceeds to block 709 for a further iteration.

At block 709, the corrected SS and LS data is used to provide an improved density image and new dip angle estimation. Thereafter, processing returns to block 704 for EVOI analysis as described above.

If analysis of the error in dip estimation provided at block 706 does not indicate that further iterations are desired, processing proceeds to block 708 wherein final SS and LS data is used to provide a final improved density image. Where it was determined that standoff or mud cake was present, at block 703, the compensated density ($\rho_{comp}$) provided at block 708 of the illustrated embodiment is calculated by adding $\Delta\rho_c$, which was subtracted at block 707 to eliminate the effects of standoff or mud cake, to the final corrected $\rho_{LS}$. Accordingly, post-processing of density tool data provided by embodiments of the invention may be used to provide accurate density and resolution enhancement with respect to density tools wherein the tool's sensors are disposed against the borehole (i.e., no standoff is present). Likewise, the foregoing post-processing techniques, adapted to implement a standoff parameter (e.g., a density correction constant, $\Delta\rho_c$), may be utilized to provide accurate density and resolution enhancement with respect to density tools wherein the tool's sensors are disposed away from the borehole (i.e., standoff is present).

As shown above, EVOI based azimuth and dip angle dependent $\Delta D$ and $\Delta h$ correction provided according to embodiments of the invention results in improved compensated density logs and density images for more accurate dip and bed boundaries. Although embodiments have been described herein with reference to embodiments using dual-detector gamma-density tools, the concepts of the invention may be applied to other density tool configurations, such as dual-detector wireline and LWD neutron tools. Similarly, the concepts of the present invention are not limited to dual-detector density tool configurations. For example, the $\Delta D$ and $\Delta h$ correction as shown herein may be applied to single detector images to produce an improved compensated image for a much more accurate estimation of bed boundaries and dip angle. Thus it should be appreciated that the concepts of the present invention may be used with respect to any tools and measurements that encounter depth and measurement point issues due to the EVOI.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   estimating a formation boundary depth from well log data, said well log data providing formation attribute data for a plurality of azimuth angles, wherein said formation boundary depth is estimated for each of said azimuth angles;
   estimating effective volume of investigation (EVOI), using a programmed computer, and using the relationship $$EVOI = \Delta D^2 \cdot \Delta h \cdot \Delta\phi$$

to determine an effective shift in height ($\Delta h$) of a formation boundary surface associated with said formation boundary depth, where $\Delta D$ is an effective depth of investigation and $\Delta\phi$ is an azimuthal aperture; and
   refining said formation boundary depth estimate using said effective shift in height ($\Delta h$).

2. The method of claim 1, wherein said well log data used in estimating said formation boundary depth comprises raw density log data, provided by a density tool, wherein said raw density log data has not been corrected for formation boundary dip.

3. The method of claim 2, wherein a value for said effective volume of investigation information is estimated from geometric factors, including detector spacing, and density information computed from the density log data.

4. The method of claim 2, wherein $\Delta D$ is estimated from configuration of the density tool and $\Delta\phi$ is defined by aperture of the density tool 5. The method of claim 1, wherein said refining said formation boundary depth estimate comprises:
   re-estimating said formation boundary depth from corrected well log data, said corrected well log data comprising said well log data having said at least one of said effective depth of investigation ($\Delta D$) and said effective shift in height ($\Delta h$) applied thereto.

6. The method of claim 1, further comprising:
   estimating a formation boundary dip angle from said well log data; and
   refining said formation boundary dip angle estimate using at least one of said effective depth of investigation ($\Delta D$) and said effective shift in height ($\Delta h$).

7. The method of claim 6, wherein said refining said formation boundary dip angle estimate comprises:
   re-estimating said formation boundary dip angle from corrected well log data, said corrected well log data comprising said well log data having said at least one of said effective depth of investigation ($\Delta D$) and said effective shift in height ($\Delta h$) applied thereto.

8. The method of claim 2, further comprising:
   subtracting a density correction constant ($\Delta\rho_c$) from said raw density log data prior to said estimating a formation boundary depth.

9. The method of claim 8, further comprising:
adding said density correction constant ($\Delta\rho_c$) to corrected well log data prior to providing a final formation boundary depth estimate from said refined formation boundary depth estimate.

10. A method comprising:
estimating a formation boundary dip angle from well log data, said well log data providing formation attribute data for a plurality of azimuth angles;
estimating effective volume of investigation (EVOI), using a programmed computer, and using the relationship $$EVOI = \Delta D^2 \cdot \Delta h \cdot \Delta\phi$$

to determine an effective shift in height ($\Delta h$) of a formation boundary surface associated with said formation boundary depth, where $\Delta D$ is an effective depth of investigation and $\Delta\phi$ is an azimuthal aperture; and
refining said formation boundary dip angle estimate using said effective shift in height ($\Delta h$).

11. The method of claim 10, wherein said well log data used in estimating said formation boundary dip angle comprises raw density log data, provided by a density tool, wherein said raw density log data has not been corrected for formation boundary dip.

12. The method of claim 11, wherein a value for said effective volume of investigation information is estimated from geometric factors, including detector spacing, and density information computed from the density log data.

13. The method of claim 11, wherein $\Delta D$ is estimated from configuration of the density tool and $\Delta\phi$ is defined by aperture of the density tool.

14. The method of claim 10, wherein said refining said formation boundary dip angle estimate comprises:
re-estimating said formation boundary dip angle from corrected well log data, said corrected well log data comprising said well log data having said at least one of said effective depth of investigation ($\Delta D$) and said effective shift in height ($\Delta h$) applied thereto.

15. The method of claim 10, further comprising:
estimating a formation boundary depth for each of said azimuth angles from said well log data; and
refining said formation boundary depth estimate using at least one of said effective depth of investigation ($\Delta D$) and said effective shift in height ($\Delta h$).

16. The method of claim 15, wherein said refining said formation boundary depth estimate comprises:
re-estimating said formation boundary depth from corrected well log data, said corrected well log data comprising said well log data having said at least one of said effective depth of investigation ($\Delta D$) and said effective shift in height ($\Delta h$) applied thereto.

17. The method of claim 11, further comprising:
subtracting a density correction constant ($\Delta\rho_2$) from said raw density log data prior to said estimating a formation boundary dip angle.

18. The method of claim 17, further comprising:
adding said density correction constant ($\Delta\rho_2$) to corrected well log data prior to providing a final formation boundary dip angle estimate from said refined formation boundary dip angle estimate.

19. A non-transitory computer readable medium storing computer executable code for well log data processing, said computer executable code comprising:
code for determining an effective shift in height ($\Delta h$) of a formation boundary dip surface as represented by well log data, said effective shift in height ($\Delta h$) being determined using at least a portion of said well log data and using the relationship $$EVOI = \Delta D^2 \cdot \Delta h \cdot \Delta\phi$$

where EVOI is an effective volume of investigation, $\Delta D$ is an effective depth of investigation and $\Delta\phi$ is an azimuthal aperture; and
code for correcting at least one of a formation boundary dip angle and a formation boundary depth using said effective shift in height ($\Delta h$), wherein said formation boundary dip angle and said formation boundary depth are determined from said well log data.

20. The non-transitory computer readable medium of claim 19, wherein said effective shift in height ($\Delta h$) is associated with an effective depth of investigation ($\Delta D$).

21. The non-transitory computer readable medium of claim 19, wherein said code for correcting said at least one of said formation boundary dip angle and said formation boundary depth comprises:
code for iteratively refining said at least one of said formation boundary dip angle and said formation boundary depth.

22. The non-transitory computer readable medium of claim 19, wherein said code for correcting said at least one of said formation boundary dip angle and said formation boundary depth corrects both said formation boundary dip angle and said formation boundary depth.

* * * * *